United States Patent
Lo et al.

(10) Patent No.: US 9,880,344 B2
(45) Date of Patent: Jan. 30, 2018

(54) LIGHT-SEALED AND LIGHT-ENHANCED DISPLAY APPARATUS

(71) Applicant: HON HAI PRECISION INDUSTRY CO., LTD., New Taipei (TW)

(72) Inventors: Wen-Chin Lo, New Taipei (TW); Chien-Yu Wei, New Taipei (TW); Chun-Yun Pan, New Taipei (TW); Sin-Tung Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/379,723

(22) Filed: Dec. 15, 2016

(65) Prior Publication Data

US 2017/0336549 A1     Nov. 23, 2017

(30) Foreign Application Priority Data

May 19, 2016   (TW) .............................. 105115479 A

(51) Int. Cl.
| | |
|---|---|
| *G02F 1/1335* | (2006.01) |
| *F21V 8/00* | (2006.01) |
| *G02F 1/1333* | (2006.01) |

(52) U.S. Cl.
CPC ............. *G02B 6/005* (2013.01); *G02B 6/009* (2013.01); *G02B 6/0088* (2013.01); *G02F 1/133308* (2013.01); *G02F 2001/133314* (2013.01)

(58) Field of Classification Search
CPC ...... G02B 6/005; G02B 6/0088; G02B 6/009; G02F 1/133308; G02F 2001/133314
See application file for complete search history.

(56) References Cited

FOREIGN PATENT DOCUMENTS

| | | |
|---|---|---|
| TW | 201525577 A | 7/2015 |
| TW | 201533510 A | 9/2015 |

*Primary Examiner* — Tracie Y Green
(74) *Attorney, Agent, or Firm* — ScienBiziP, P.C.

(57) ABSTRACT

A display apparatus utilizing all light output by a light source also includes a display panel with a shield portion, a light guide plate, and a quantum dot enhancement layer. The display panel includes a display portion and a shield portion. The light guide plate is parallel with the display panel and guides light emitted by the light source to the display panel. The quantum dot enhancement layer converts a wavelength of the light and the shield portion is configured to reflect stray or escaping light back into the quantum dot enhancement layer for conversion. The surface of the light guide plate is overlapped with the shield portion for preventing any light leakage and the mixing of light of different wavelengths and thus colors is increased and improved.

19 Claims, 5 Drawing Sheets

LIGHT-SEALED AND LIGHT-ENHANCED DISPLAY APPARATUS

CROSS-REFERENCE TO RELATED APPLICATIONS

This application claims priority to Taiwanese Patent Application No. 105115479 filed on May 19, 2016, the contents of which are incorporated by reference herein.

FIELD

The subject matter herein generally relates to a display apparatus.

BACKGROUND

A display apparatus includes a display panel and a backlight module for providing a backlight to the display panel. The backlight module includes a frame, a light source, and a light guide plate, and a quantum dot enhancement film (QDEF). The light source, the light guide plate, and the QDEF are received in the frame. The QDEF overlaps the light guide plate and a part of the frame. There may be light leakage at the region of the QDEF overlapped with the frame. The leakage of light from the display apparatus can be improved upon by a better structure.

BRIEF DESCRIPTION OF THE FIGURES

Implementations of the present technology will now be described, by way of example only, with reference to the attached figures.

DETAILED DESCRIPTION

Figure 1:
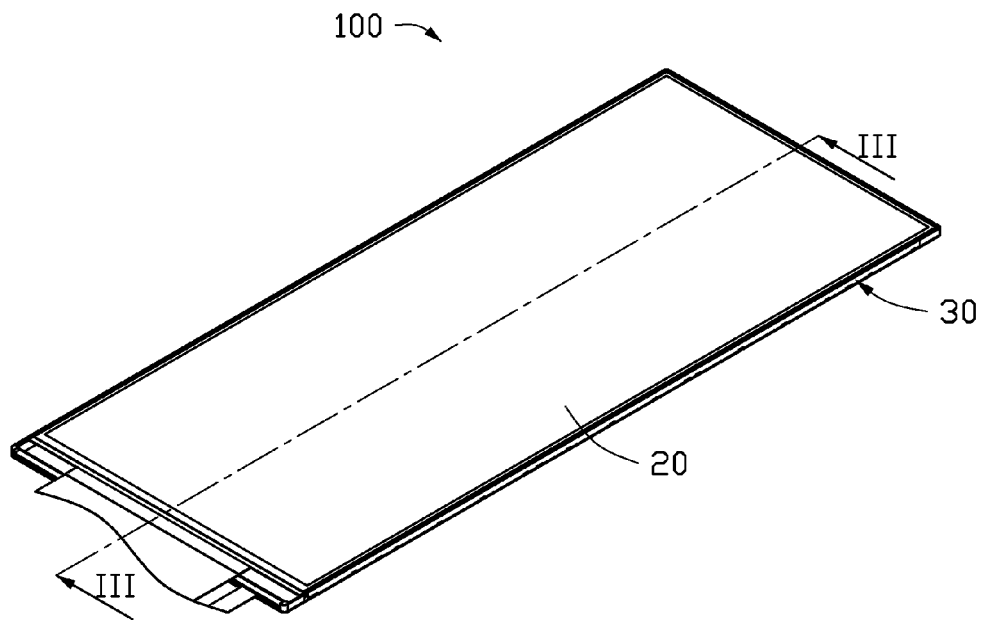
FIG. 1 is an isometric view of an exemplary embodiment of a display apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

The present disclosure is described in relation to a display apparatus.

FIG. 1 illustrates an exemplary embodiment of a display apparatus 100. The display apparatus 100 can be for example a liquid crystal display (LCD).

Figure 2:
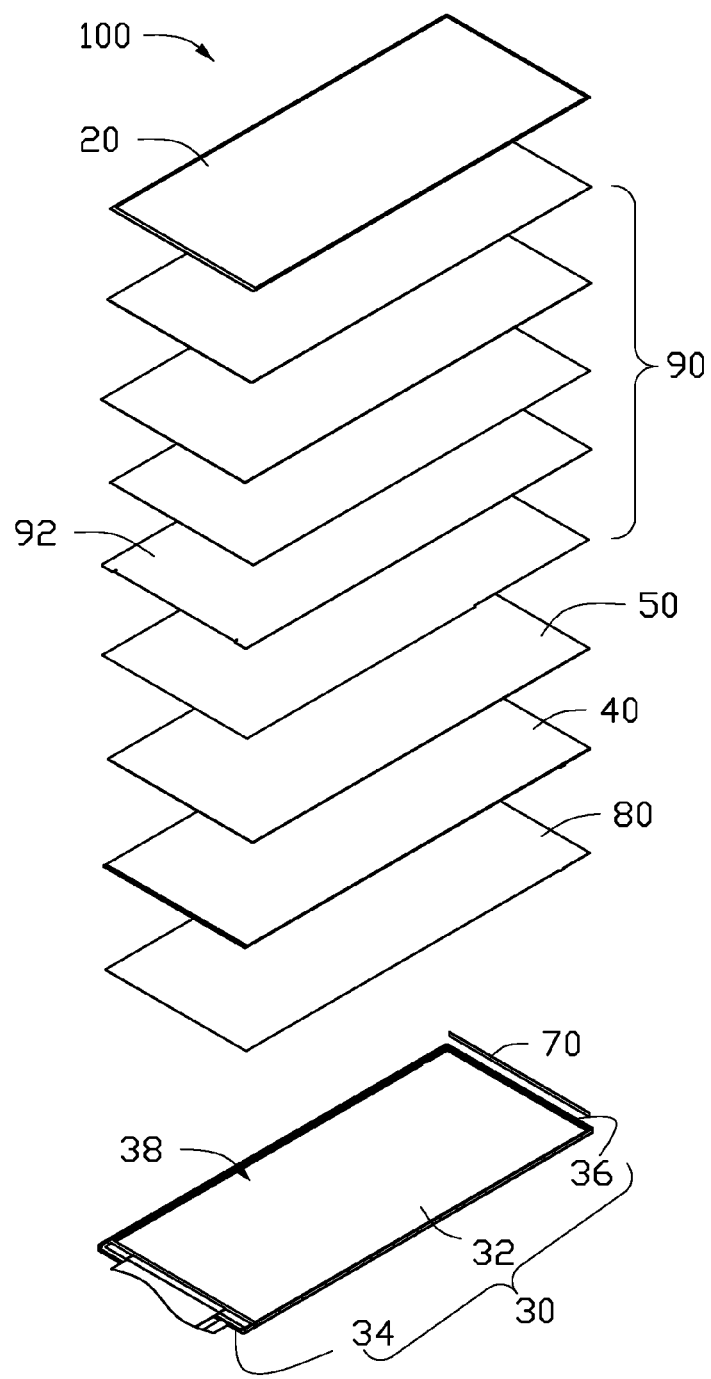
FIG. 2 is an exploded view of the display apparatus of FIG. 1.
Figure 3:
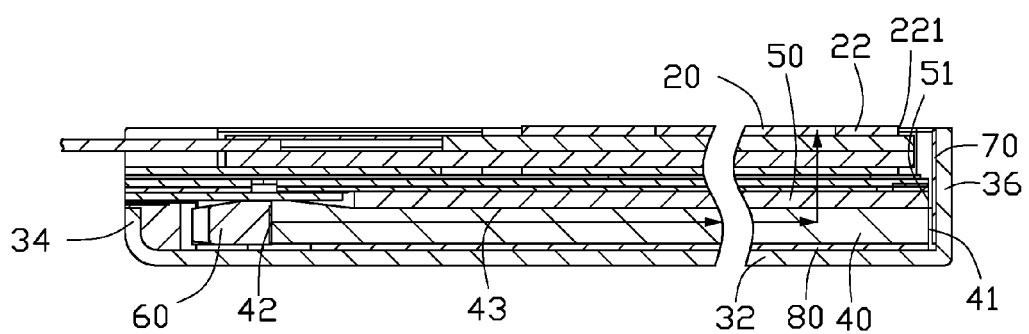
FIG. 3 is a cross-sectional view of a first exemplary embodiment of the display apparatus of FIG. 1.

FIG. 2 illustrates the display apparatus 100 in an exploded view. The display apparatus 100 includes a display panel 20, a frame 30, a light guide plate 40, a quantum dot enhancement layer 50, and a light source 60 (as shown in FIG. 3). Light emitted by the light source 60 sequentially passes through the light guide plate 40 and the quantum dot enhancement layer 50, and is provided to the display panel 20 as a backlight. The frame 30 defines a space for receiving the light guide plate 40 and the quantum dot enhancement layer 50.

The display panel 20 is substantially a rectangular. In another exemplary embodiment, the display panel can be any other shape. In at least one exemplary embodiment, the display panel 20 further includes a liquid crystal layer (not shown) and a thin film transistor (TFT) substrate (not shown). The display panel 20 includes a display portion 21 and a shield portion 22 (as shown in FIG. 3). The display portion 21 is configured for displaying images. The shield portion 22 is adjacent to a side of the display portion 21. The display panel 20 is supported by the frame 30, with the shield portion 22 directly or indirectly connected to the frame 30. The shield portion 22 blocks light from entering into a region besides the display portion 21. The shield portion 22 includes a third surface 221. The third surface 221 face the second wall 36.

The frame 30 includes a bottom plate 32, a first wall 34, and a second wall 36 parallel with the first wall 34. The first wall 34 and the second wall 36 are perpendicularly extended from edges of the bottom plate 32. The bottom plate 32, the first wall 34, and the second wall 36 cooperatively form a receiving space 38 for receiving the light guide plate 40, the quantum dot enhancement layer 50, and the light source 60.

The light guide plate 40 is disposed on the bottom plate 32. The light guide plate 40 includes a first surface 41, a light incident surface 42, and a light emitting surface 43. The first surface 41 faces the second wall 36 and faces away from the light source 60. The light incident surface 42 faces the light source 60, and guides the light from the light source 60 to the light emitting surface 43. The light emitting surface 43 is parallel with the bottom plate 32, and faces the display panel 20.

The light source 60 may emit light which has a first wavelength. The light source 60 faces the light incident surface 42 of the light guide plate 40 for outputting the light into the light guide plate 40 (as shown in FIG. 3). The light guide plate 40 is parallel with the display panel 20. The light guide plate 40 guides the light from the light source 60 to the display panel 20. The light emitting surface 43 of the light guide plate 40 is perpendicular to the light incident surface 42 of the light guide plate 40. The first surface 41 is overlapped with the shield portion 22 along a direction perpendicular to the display panel, and the first surface 41 is located outside the third surface 221.

Figure 5:
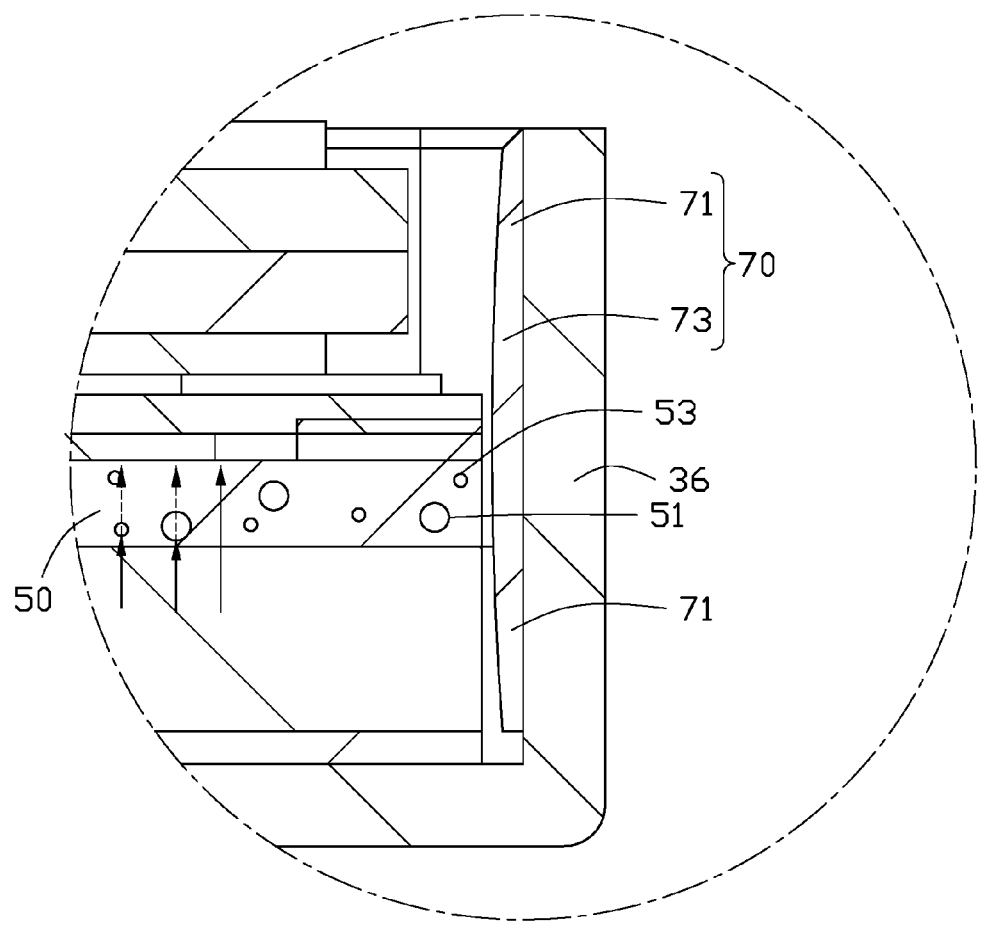
FIG. 5 is an enlarged view of circle V of the display apparatus of FIG. 4.

The quantum dot enhancement layer 50 is disposed on the light guide plate 40. The quantum dot enhancement layer 50 converts wavelengths of light from the light guide plate 40 to other wavelengths. In at least one exemplary embodiment, the quantum dot enhancement layer 50 converts the wavelength of light from the light guide plate 40 into two different wavelengths of light. Different wavelengths have different colors, which are different from the first primary color. In an example, the quantum dot enhancement layer 50 includes first quantum dots 51 (as shown in FIG. 5) and second quantum dots 53 (as shown in FIG. 5). A diameter of the first quantum dot 51 is different from a diameter of the second quantum dot 53. The light emitted into the first quantum dots 51 is converted into light with a second wavelength (as the broken line shown in FIG. 5), and the light emitted into the second quantum dots 53 is converted into light with a third wavelength, and the light without passing through the first quantum dots 51 and the second quantum dots 53 are directly emitted (as shown the straight line in FIG. 5), thus the light converted by the first quantum dots 51, the light converted by the second quantum dots 53, and the light without passing through the first quantum dots 51 and the second quantum dots 53 are mixed to generate white light as a backlight of the display panel 20. In at least one exemplary embodiment, the quantum dot enhancement layer 50 is made of nano materials.

The quantum dot enhancement layer 50 further includes a second surface 52 facing away from the light source 60. Along a direction perpendicular to the display panel, the first surface 41 and the second surface 52 are located outside a third surface 221. The second surface 52 is aligned with the first surface 41 along a direction perpendicular to the display panel.

The light source 60 faces the light incident surface 42 (as shown in FIG. 3). The light source 60 is fixed on the first wall 34. The light source 60 emits light with a first wavelength corresponding to a first primary color. In at least one exemplary embodiment, the light source 60 is a light emitting diode and emits blue light. In other exemplary embodiments, the light source 60 can emit green light.

A reflector portion 70 is disposed on an inner surface of the second wall 36. The reflector portion 70 faces away from the light source 60. The reflector portion 70 faces the light guide plate 40, and faces away from to the light source 60. The reflector portion 70 is perpendicular to the bottom plate 32, and is substantially rectangular. The reflector portion 70 can reflect light received to the quantum dot enhancement layer 50. In at least one exemplary embodiment, the reflector portion 70 is attached to the second wall 36. The reflector portion 70 can be a white or a silver reflector film. A reflectivity of the reflector portion 70 is more than 50%.

A reflector 80 is disposed on the bottom plate 32. The reflector 80 can reflect light leaking from the bottom of the light guide plate 40 back into the light guide plate 40.

An optical film layer 90 (as shown in FIG. 1) is disposed between the display panel 20 and the light guide plate 40. The optical film layer 90 includes at least one optical film 92 (as shown in FIG. 1). The optical film layer 90 adjusts an optical characteristic of the light provided to the display panel 20. In at least one exemplary embodiment, the optical film layer 90 can include a diffusing film (not shown), a prismatic film (not shown), and a brightness enhancing film (not shown).

Light passing through the edges of the quantum dot enhancement layer 50 is blocked by the shield portion 22, and all light from the light source 60 is emitted into each part of the quantum dot enhancement layer 50. The reflector film 41 reflects escaping light back into the quantum dot enhancement layer 50 for enhancing light intensity, thus light leakage from the display apparatus 100 is prevented and a display effect of display apparatus is improved.

Figure 4:
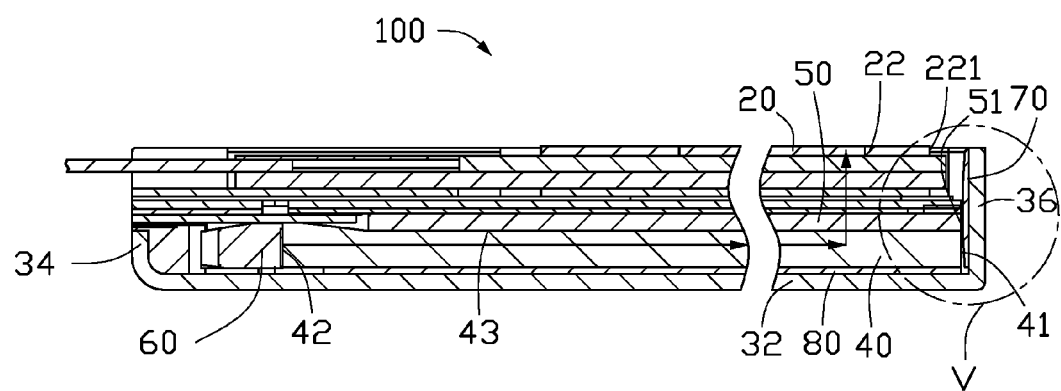
FIG. 4 is a cross-sectional view of a second exemplary embodiment of the display apparatus of FIG. 1.

FIG. 4 illustrates a second exemplary embodiment of the display apparatus 200 in cross-section. The display apparatus 200 according to the second exemplary embodiment is approximately the same as the display apparatus 100. The elements in the display apparatus 200 are substantially same as in the display apparatus 100. The display apparatus 200 includes a display panel 20, a frame 30 (as shown in FIG. 1), a light guide plate 40, a quantum dot enhancement layer 50, a light source 60, a reflector portion 70, a reflector 80, and an optical film layer 90 (as shown in FIG. 1). The differences between the display apparatus 200 and the display apparatus 100 will now be described.

A surface of the reflector portion 70 facing the light guide plate 40 protrudes to the second wall 36. A width of a middle portion 73 of the reflector portion 70 is larger than a width of an edge portion 71 of the reflector portion 70 along a direction parallel with a surface of the display panel 20 (as shown in FIG. 5). In at least one exemplary embodiment, the reflector portion 70 is convex and is mirrored for improving reflectivity of the reflector portion 70.

While various exemplary and preferred exemplary embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A display apparatus comprising:
    a display panel having a display portion configured to display images, and a shield portion adjacent to the display portion;
    a light source configured to emit light;
    a light guide plate parallel with the display panel, and the light guide plate configured to guide the light emitted by the light source to the display panel; and
    a quantum dot enhancement layer disposed between the display panel and the light guide plate, and the quantum dot enhancement layer configured to convert a wavelength of light, and the quantum dot enhancement layer including a first surface facing away from the light source;
    wherein the light guide plate comprises a second surface facing away from the light source; the light emitted by the light source and guided by the light guide plate is inputted into each part of the quantum dot enhancement layer and being converted by the quantum dot enhancement layer; the second surface of the light guide plate overlaps with the shield portion for preventing leakage of the display apparatus.

2. The display apparatus of claim 1, wherein the first surface is aligned with the second surface along a direction perpendicular to the display panel.

3. The display apparatus of claim 1, wherein the shield portion includes a third surface; the outer surface faces away from the light source; the first surface and the second surface are located outside the third surface along a direction perpendicular to the display panel.

4. The display apparatus of claim 1, further comprising a reflector portion adjacent to the first surface of the quantum dot enhancement layer, the reflector portion reflects the input light from the light guide plate to the quantum dot enhancement layer.

5. The display apparatus of claim 4, wherein the shield portion includes a third surface; the outer surface faces away from the light source; the first surface and the second surface are located outside the third surface the shield portion along a direction perpendicular to the display panel, the light from the reflector portion inputs into the quantum dot enhancement layer.

6. The display apparatus of claim 3, wherein a surface of the reflector film facing the light guide plate is protruded to the light guide plate; a width of a middle portion of the reflector film is larger than a width of an edge portion of the reflector film along a direction parallel with a surface of the display panel.

7. The display apparatus of claim 3, wherein a reflectivity of the reflector film is more than 50%.

8. The display apparatus of claim 1, wherein the display apparatus comprises a frame; the frame comprises a first wall and a second wall; the first wall and the second wall are perpendicularly extended from edges of the bottom plate; the light source is fixed on the first wall, and the reflector film is attached to the second wall.

9. The display apparatus of claim 1, wherein an edge of the quantum dot enhancement layer is aligned with an edge of the light guide plate.

10. The display apparatus of claim 1, wherein the light passing through the quantum dot enhancement layer and the light converted by the quantum dot enhancement layer are mixed to generate white light to provide to the display panel as a backlight.

11. The display apparatus of claim 1, further comprising a reflector; wherein the light guide plate is set between the display panel and the reflector; the reflector reflects light leaking from the bottom of the light guide plate back to the light guide plate, the reflector is substantially perpendicular to the reflector portion.

12. A display apparatus comprising:
a display panel with a display portion configured to display images, and a shield portion adjacent to the display portion;
a light source configured to emit light with a first wavelength;
a light guide plate parallel with the display panel, and the light guide plate configured to guide the light emitted by the light source to the display panel; and
a quantum dot enhancement layer disposed between the display panel and the light guide plate, and the quantum dot enhancement layer configured to convert the first wavelength of the light into two different wavelengths;

wherein the quantum dot enhancement layer comprises a first surface facing away from the light source; the light guide plate comprises a second surface facing away from the light source; the shield portion includes a third surface; the outer surface faces away from the light source; the first surface and the second surface are located outside the third surface along a direction perpendicular to the display panel.

13. The display apparatus of claim 12, the first surface is aligned with the second surface along a direction perpendicular to the display panel.

14. The display apparatus of claim 12, further comprising a reflector portion opposite to the light source, wherein the reflector portion faces the first surface of the light guide plate; the reflector portion reflects light from the quantum dot enhancement layer back to the quantum dot enhancement layer.

15. The display apparatus of claim 14, wherein a surface of the reflector film faced the light guide plate is protruded to the light guide plate; a width of a middle portion of the reflector film is larger than a width of an edge portion of the reflector film along a direction parallel with a surface of the display panel.

16. The display apparatus of claim 14, wherein a reflectivity of the reflector film is more than 50%.

17. The display apparatus of claim 12, wherein the display apparatus comprises a frame; the frame comprises a first wall and a second wall; the first wall and the second wall are perpendicularly extended from edges of the bottom plate; the light source is fixed on the first wall, and the reflector portion is attached to the second wall.

18. The display apparatus of claim 12, wherein the light passing through the quantum dot enhancement layer and the light converted by the quantum dot enhancement layer are mixed to generate white light to provide to the display panel as a backlight.

19. The display apparatus of claim 12, further comprising a reflector; wherein the light guide plate is set between the reflector and the display panel; the reflector reflects light leaking from the bottom of the light guide plate back to the light guide plate; the reflector is substantially perpendicular to the reflector portion.

* * * * *